A. SCHNEIDER.
METAL PIPE AND HOSE CONNECTION.
APPLICATION FILED JUNE 11, 1913.
1,110,011.
Patented Sep. 8, 1914.
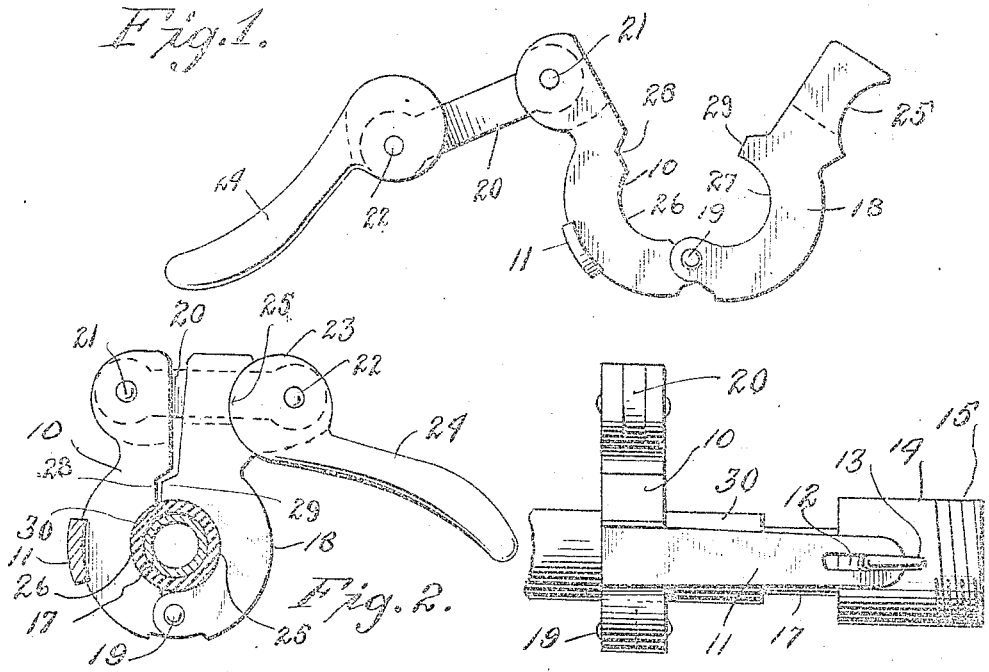
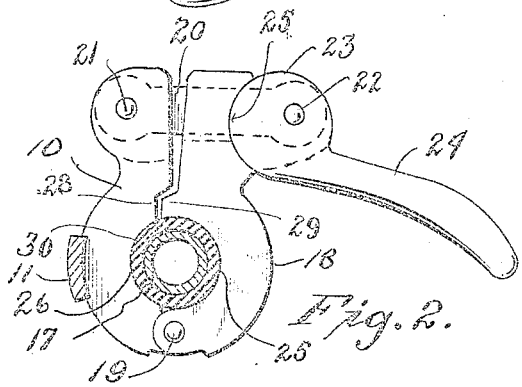
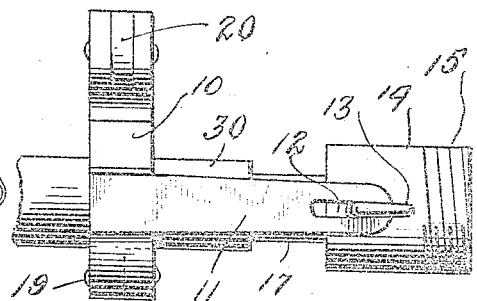
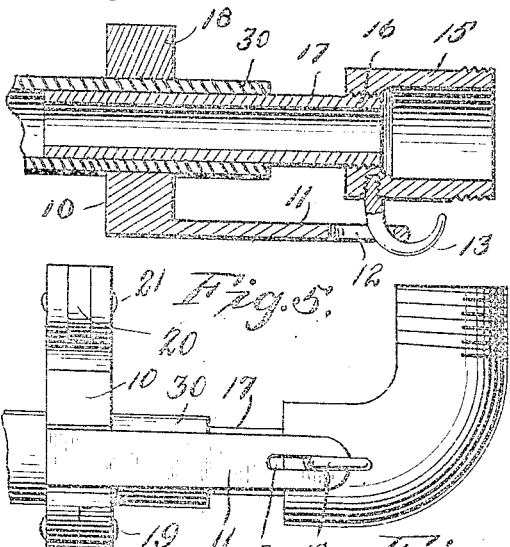
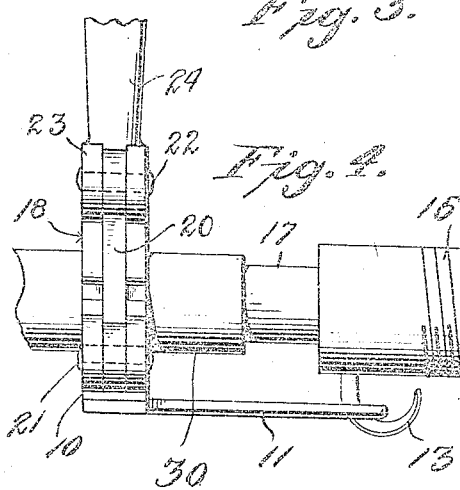
Witnesses
Inventor
A. Schneider
By
Attorneys

UNITED STATES PATENT OFFICE.

ALFRED SCHNEIDER, OF BIRMINGHAM, ALABAMA.

METAL PIPE AND HOSE CONNECTION.

1,110,011.   Specification of Letters Patent.   Patented Sept. 8, 1914.

Application filed June 11, 1913. Serial No. 773,064.

*To all whom it may concern:*

Be it known that I, ALFRED SCHNEIDER, a citizen of the Republic of Switzerland, residing at Birmingham, in the county of Jefferson, State of Alabama, have invented certain new and useful Improvements in Metal Pipe and Hose Connections; and I do hereby declare the following to be a full, clear, and exact description of the invention, such as will enable others skilled in the art to which it appertains to make and use the same.

This invention relates to hose couplings, and it more particularly relates to an improved form of metal pipe and hose connection.

An object of the invention is to provide an improved form of hose coupling by means of which a hose may be quickly and securely attached to pipe connections of different sizes and kinds.

Another object of the invention is to provide a device of this character by means of which the hose may be quickly, conveniently and securely attached, and quickly disconnected.

Another object of the invention is to provide a device of this character which is especially applicable for connection to high pressure pipes and hose, for instance, in shops, factories, etc., in the employment of compressed air, steam, gas or liquids.

Another object of the invention is to provide a hose coupling of this character which is comparatively simple of construction, compact, strong and durable, and thoroughly efficient in its operation.

Other objects and advantages may be recited hereinafter and in the claim.

In the accompanying drawings which supplement this specification: Figure 1 is an end elevation view of the device in open position. Fig. 2 is a somewhat similar view, the device being shown in closed and operative position, the hose and certain other elements being in section. Fig. 3 is a side elevation view of the device in operative position. Fig. 4 is a top plan view. Fig. 5 is a horizontal section through the device and the contiguous sections of hose and metal pipe, and Fig. 6 is a fragmental detail view illustrating a somewhat different application of the device.

Referring to these drawings, in which similar reference characters correspond with similar parts throughout the several views: The hose coupling comprises a clamping jaw 10 having an arm 11 either formed integrally therewith or secured thereto, said arm being apertured at 12 for the reception of a hook or stud 13 by which it is secured to and adapted to be suspended from the major nipple or pipe connection 14. This member 14 is centrally screw-threaded at 15 and adapted to be fitted to other pipe connections in the usual manner. This major nipple is centrally threaded at 16 for the reception of a minor nipple 17, and this minor nipple is of greater length than the arm 11 and extends past the clamping jaw 10 when in its operative position. A clamping jaw 18 is pivotally connected at 19 to the first said clamping jaw. Each of these clamping jaws is provided with a bifurcated end between the furcations of which is adapted to be seated a link 20, one end of said link being pivoted at 21 to the bifurcated end of the member 10, while the other end of said link is pivoted at 22 to a bifurcated cam 23 between the furcations of which one end of said link is seated. A handle or lever 24 is secured to and extends from the cam 23. The bifurcated end of the member 18 is provided with an arcuate or concaved surface 25 in which the cam 23 is seated when the device is in its operative position. The members 10 and 18 are provided with substantially semi-circular or arcuate surfaces 26 and 27, which combine to form a circular opening through the clamp when in closed position. A notch 28 is formed at one end of the recess 26, and a lug 29 is formed at one end of the recess 27; so that when the clamp is closed, the lug 29 fits within the recess 28. When the clamp is not in use, it swings or depends from the hook 13, in such position as to leave the nipple 17 unobstructed thereby, so that a section of the hose, as indicated by the numeral 30, may be quickly and easily placed around the nipple 17, so as to embrace approximately or more than one-half of the length of said nipple, whereupon the arm 11 is swung upward, together with the members supported thereby, so that the concaved surfaces 26 and 27 surround said hose section. The clamping members 10 and 18 are then swung on their pivot 19 into proximity with one another, and the link 20 and the combined handle and cam member are swung into their operative position. The handle 24 is now swung downward, so that the cam 23 presses the bifurcated ends of the members 10 and 18 into proximal relation, and the hose is clamped tightly between the arcuate surfaces 26 and 27.

It will be seen that the hose may be clamped very tightly and securely upon the pipe connection or nipple 17, and that the arm 11 and hook 12 coöperate with the frictional engagement of the hose and nipple for preventing relative longitudinal movement thereof. It will also be seen that the hose may be instantaneously disengaged by simply manipulating the handle 24 with one hand while withdrawing the hose with the other.

It will be seen that I have provided a hose coupling of this character which is fully capable of attaining the foregoing objects, in a thoroughly practical and effective manner.

I do not limit my invention to the exact details of construction, combination and arrangement of parts, as herewith illustrated and described, but my invention may only be limited by a reasonable interpretation of the claim.

I claim:

In a hose and pipe coupling, a pipe connection having a stud thereon, a bifurcated clamping member having a concaved surface and an apertured arm thereon in engagement with said stud, a second bifurcated clamping member pivotally connected to said first clamping member, an arcuate cam seat formed externally with said member having a concaved surface, a link pivoted to one of said clamping members, a handle pivotally connected to the link, a cam formed with the handle adapted to engage said cam seat when the link is engaged with said second bifurcated member for tightening said clamping members upon a pair of hose sections.

In testimony whereof, I affix my signature, in the presence of two witnesses.

ALFRED SCHNEIDER.

Witnesses:
R. D. JOHNSTON, Jr.,
W. T. SHANNON.